| United States Patent [19] | [11] Patent Number: 4,961,989 |
|---|---|
| Grimwood | [45] Date of Patent: Oct. 9, 1990 |

[54] FIRE-RESISTING MATERIAL

[75] Inventor: David A. Grimwood, Longlevens, Great Britain

[73] Assignee: Insumat Limited, London, England

[21] Appl. No.: 483,972

[22] Filed: Feb. 20, 1990

Related U.S. Application Data

[63] Continuation of Ser. No. 361,695, Jun. 1, 1989, abandoned, which is a continuation of Ser. No. 30,238, Mar. 26, 1987, abandoned.

[30] Foreign Application Priority Data

Mar. 27, 1986 [GB] United Kingdom ............... 8607804

[51] Int. Cl.$^5$ ...................... B32B 19/02; B32B 25/20; B32B 31/20; B32B 33/00
[52] U.S. Cl. .................... 428/229; 264/257; 427/369; 427/370; 427/387; 428/251; 428/266; 428/269; 428/272; 428/286; 428/302; 428/391; 428/447; 428/921; 244/21; 244/2
[58] Field of Search ............... 428/266, 269, 447, 921, 428/229, 272; 427/387, 369, 370

[56] References Cited

U.S. PATENT DOCUMENTS

| 3,250,662 | 5/1966 | Seaman | 428/269 |
|---|---|---|---|
| 4,020,209 | 4/1977 | Yuan | 428/269 |
| 4,246,313 | 1/1981 | Stengle | 428/266 |
| 4,308,309 | 12/1981 | Leiser et al. | 428/447 |
| 4,540,617 | 9/1985 | Kawaniski et al. | |
| 4,600,634 | 7/1986 | Langer | 428/921 |
| 4,619,553 | 10/1986 | Fischer | 428/266 |
| 4,714,650 | 12/1987 | Obaiashi et al. | 428/367 |

FOREIGN PATENT DOCUMENTS

| 2716706 | 4/1977 | Italy . | |
|---|---|---|---|
| 185442 | 8/1986 | Japan . | |
| 1185442 | 8/1986 | Japan | 428/266 |

*Primary Examiner*—James C. Cannon
*Attorney, Agent, or Firm*—Howard L. Rose

[57] ABSTRACT

A coherent fire-resisting flexible sheet material for aerospace applications is provided consisting of a layer of ceramic fibers embedded in a silicone rubber compound. The ceramic fibers may be in the form of a plain woven fabric of monofilament fibers of alumino-boro-silicate and the silicone rubber compound can be a curable non-foaming methylphenyl silicone compound. In production, the silicone compound is applied to the fabric as a thixotropic paste in sufficient quantity to entirely cover and impregnate the fabric and is forced through the interstices of the fabric by the application of pressure. The coated and impregnated fabric is then placed in an oven to cure the silicone compound.

11 Claims, 1 Drawing Sheet

FIRE-RESISTING MATERIAL

This is a continuation, of co-pending application Ser. No. 07/361,695, filed on Jun. 1, 1989, now abandoned and application Ser. No. 030,238 filed on Mar. 26, 1987, now abandoned.

This invention relates to fire-resisting materials, in particular for aerospace use.

In the aerospace field, there are many applications for which a flexible sheet fire-resistant material is needed that will withstand a moderately high temperature continuously and very high temperatures for short periods. Thus, the current requirement in the latter case is for a material with a fire resistance of 1100° C. for 15 minutes. It is therefore an object of the invention to provide an improved material to fulfill this requirement.

According to the present invention, a coherent fire-resisting flexible sheet material consists of a layer of ceramic fibres embedded in a silicone compound. In the preferred form, the ceramic fibre layer is in the form of a woven fabric and the silicone compound is applied in the form of a paste to impregnate and cover the fabric, the composite sheet then being cured.

Further details of particular materials according to the invention and test results obtained therewith will now be given by way of example and with reference to the accompanying drawings in which:

FIGS. 2 and 3 show both sides of the material after exposure to a flammability test.

Figure 1:
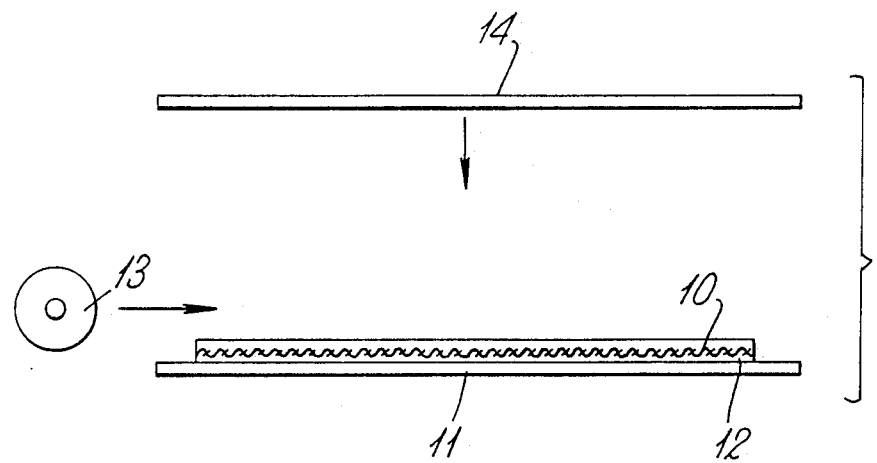
FIG. 1 illustrates the manufacture of material according to the invention.

The material the production of which is now to be described consists of a high temperature woven fabric impregnated with a fire-resistant silicone rubber compound. Its primary use is in the aerospace field, such as for fire shields, smoke shields, seals, flexible joints, bellows, gaskets and other thermal barrier applications.

The woven fabric used is a plain weave made of continuous mono-filament ceramic fibres, typically aluminoboro-silicate obtainable from Morganite Ceramic Fibres Ltd. This fabric can withstand a continuous temperature of 1260° C., with short term temperatures up to 1400° C. The impregnating compound is a curable white thixotropic silicone paste with which the fabric can be impregnated and cured to give any required thickness. The resulting material is a white shiny-surfaced very flexible sheet which can resist intermittent temperatures above 2000° C. and continuous environmental temperatures of 300° C., and will also meet the aerospace fire resistance requirement of 1100° C. for 15 minutes.

In manufacture, the ceramic woven fabric is embedded in the silicone paste to give an even dispersion and total encapsulation of the fabric. Curing then takes place for 20 minutes at 166° C. or 30 minutes at 100° C. For such single sheet manufacture the composite material density is 1.05±0.02 Kg/m, The thermal conductivity is approximately 0.25 W/mK at 150° C.

The sheet material manufactured in this way exhibits reasonable coherence. However, if desired, reinforcing, e.g. metal wire reinforcing, can be introduced into the material during manufacture. The most usual reinforcement will be wires of stainless steel or Inconel.

EXAMPLE

White ceramic fibre cloth was used consisting of a plain weave of 0.35 mm nominal thickness made of continuous ceramic fibres of 11 μm average diameter, the ceramic being alumino-boro-silicate having a composition by weight of 62% $Al_2O_3$, 24% $SiO_2$ and 14% $B_2O_3$.

The impregnating compound used was a methyl-phenyl silicone rubber compound in the form of a curable non-foaming white thixotropic paste available from General Electric under their designation TBS-758. This product comes as two components—a main component TBS-758A which has to be mixed with 10% by weight of a curing agent TBS-758B, the pot life of the mixed material being a maximum of six hours at room temperature.

Referring to FIG. 1, to produce a flat sheet of product according to the invention 300 mm ×300 mm, the ceramic fibre cloth 10 was cut to this size plus a border of at least 2.5 cm all around in excess of the finished size. The cut fabric was laid horizontally on a polished lower platen 11 and spread with the mixed two-component silicone rubber compound paste 12, using a spatula, until the whole of the fabric was well covered. The pasted fabric was then turned over paste side down on the platen and the upper side rolled with a "wet lay-up" roller 13 to squeeze the paste through the interstices of the cloth weave. When the cloth had been fully impregnated in that way, the top surface was spread with further silicone rubber paste until well covered.

A polished upper platen 14 was then placed over the coated fabric and clamped down on to the lower platen and the pair of platens with the fabric between were placed in a curing oven at 100° C. ±5° C. for 30 minutes. At the end of this cure time, the platens and fabric were removed from the oven and allowed to cool, after which the platens were separated and the coated fabric inspected with a light box for any defects.

It is also possible to make shaped moulded items by pressing between co-operating mould tools, vacuum moulding or injection moulding. Reinforcing materials, if required, are assembled into the moulds and secured in position prior to moulding. Multi layers of fabric and reinforcing materials can be laid up and bonded in one operation. Reinforcing materials should always be of noncorrosive materials.

Thermal Conductivity

A sample of the material was examined for thermal conductivity to BS 874 with the following results:

| Test thickness, mm | Test density, kg/m³ | Test Temperatures, °C. | | | Thermal conductivity, W/m.K |
| --- | --- | --- | --- | --- | --- |
| | | Cold face | Hot face | Mean | |
| 2.13 | 1427 | 20 | 80 | 50 | 0.263 ± 8% |
| 2.13 | 1427 | 20 | 115 | 67.5 | 0.258 ± 8% |
| 2.13 | 1427 | 20 | 150 | 85 | 0.252 ± 8% |

Two specimens approximately 76 mm diameter were each prepared by layering two approximately 1 mm thick discs cut from the sample for test, and applying a thin coat of silicone grease at the interface. These were then tested for thermal conductivity in accordance with BS 874:1973 Clause 4.2.3 by heated disc apparatus.

The specimens underwent a 3.6% reduction in thickness during test. The tabulated results were calculated using the mean of in and out test thicknesses and the uncertainty increased from the value of ± 5% normally associated with measurements of this type to ± 8%.

Torching Test I

The composite flame shield material as above, without metal reinforcement, was subjected to a torching test.

A gas, oxygen, air glass-blowing torch was set up with its nozzle 80 mm away from a 150 mm × 100 mm sample. This gave 30 mm² of intense flame. The torch was then removed, re-lit and replaced. On replacement, the hot face of the sample flamed very slightly for approx. 10 seconds. Temperature readings were taken of the hot and cold faces of the sample and were as follows:

| | |
|---|---|
| Hot face | 1400° C. |
| Cold face | 1100° C. |

The test was allowed to run until the flame broke through the sample; this happened after 15 minutes thus ending the test.

On examination of the test sample a hole of approx. 1 to 2 mm, was found in the centre of the flame-affected area. Also the following observations were made. On the hot face the silicone was burnt away in an area of about 30 mm² and was cracked in an area of about 70 mm².

On the cold face the silicone was only cracked and not burnt away, the area affected like this being about 50 mm².

From this test it was concluded that a non-pressurised flame of 1100° C. can be resisted without flame penetration for 15 minutes.

Flammability Test

The flammability test was conducted according to SD-24K, Vol. 11, Section 3.11.4 which states the material must be capable of withstanding a 2000° F. flame over an area of five square inches for aperiod of fifteen (15) minutes without flame penetration.

The test set up consisted of four burners resulting in a total grid area of 5.0 square inches. All four burners were fed from a common source, a 120 pound cylinder of technical grade (95%) butane.

The material after exposure was exposed to 2000° F. for fifteen (15) minutes resulting in the coating on the flame exposed side being discoloured and cracked but still intact on the surface. The coating on the side opposite the flame was cracked and only slightly discolored.

During the test, no substantial amount of smoke was noticed nor was there any flame penetration. The surface exposed to the flame glowed while the opposite side remained the original white color.

Based on these test results, the material is recommended for use in the smoke shields for aircraft engine compartments.

Torching Test II

A further torching test was performed using a test burner conforming to the Type A, 19 mm nominal diameter burner defined in BS 3G.100 : Part 2 : Section 3 : Subsection 3.13 : 1973 (1983), Table 1. The burner was calibrated, after the five minute warm up period required in Paragraph A.4., in accordance with Appendix E. Paragraph E.1. and was operated under the following conditions:

| | |
|---|---|
| Propane pressure | 3.5 p.s.i.g. |
| Flame temperature | 1100° C. ± 10° C. |
| Distance from test specimen | 50 mm |

Test 1

A 178 mm square of the material to be tested was mounted in the vertical plane and the test torch positioned so that its nozzle was 50 mm from the centre of its vertical face and perpendicular to it. The torch was then turned away from the specimen, lit and allowed to stabilise for five minutes. It was then turned back so that the flame impinged on the specimen and the test was timed from this point. Observations of the specimen behaviour were made at such time as any changed occurred and at the 15 minute fire proof requirement time. The test was continued to 30 minutes and then terminated.

Test 2

A specimen strip 100 mm ×25 mm was clamped between two pieces of 1 mm thick stainless steel sheet and set up with its long axis vertical and the burner positioned so that its centre was level with the centre of the specimen and at approximately 45° to the surface of the stainless steel, the flame thus playing on the edge of the specimen nearest to the burner and the centre face of the strip.

The burner flame was applied to the test specimen for 15 minutes and the specimen was then allowed to cool naturally prior to disassembly and inspection of the specimen.

The observations and results of Test 1 are tabulated below:

| Time, Minutes | Observations |
|---|---|
| 0 | Burner applied. |
| ½ | Small amount of flame and smoke produced quickly dimishing. |
| 4 | The unexposed face of the material showed some cracking coincident with the area exposed to the flame. |
| 15 (fireproof requirement) | No flame penetration of the material. The unexposed face of the material showed dull red hot with slightly brighter lines where it was cracked. |
| 30 | No penetration by the test flame and little increase in damage from the 15 minutes situation. |

On examination when cold the damaged area proved to be about 80 mm diameter. None of the material on either side of the sheet had broken off. When held up to the light, slight pinholes could be seen where the sheet had cracked.

Regarding Test 2, before the specimen was disassembled for examination, the edges of the material were inspected for damage. The edge nearest the test flame was charred upwards from the level of the lower edge of the flame, while the edge remote from the test flame only showed damage at the level of the centre of the strip. There was slight distortion of the stainless steel sheets where the hottest part of the test flame had been on them. After disassembly the material was found to be virtually unaffected for the top 10 mm and lower 25 mm; between these limits the central section of the material was degraded and charred, but still physically intact.

From these tests, it can be concluded that the material not only conforms to the fireproofing requirement of BS 3G.100 but exceeds it by a margin of at least 100%.

Further tests were performed with a large number of specimens after they had been contaminated with different fluids, including various aviation fuels, lubricating oils, aircraft hydraulic fluids, cleaning fluids and so forth. In every case the tested specimen met the requirements of the BS 3G.100 test.

I claim:

1. A flame resistant material, comprising:
a coherent flexible sheet capable of nondestructive flame resistance for at least approximately fifteen minutes at 1100° C. said sheet including a flexible layer of refractory ceramic fibers fully impregnated by and totally encapsulated within a fire resistant silicone rubber compound.

2. A material according to claim 1, wherein the layer of ceramic fibres is in the form of a woven fabric.

3. A material according to claim 2, wherein the woven fabric is a plain weave of monofilament fibers.

4. A material according to claim for claim 2 or claim 3, wherein the ceramic fibers are of alumino-boro-silicate.

5. A material according to claim 4, wherein the aluminoboro-silicate has the composition:
62% $Al_2O_3$
24% $SiO_2$
14% $B_2O_3$.

6. A material according to any preceding claim 1 wherein the ceramic fibers are of 11 μm average diameter 7. A material according to claim 1 for claim 6, wherein the silicone compound is a cured non-foaming methyl-phenyl silicone rubber compound.

8. A material according to claim 1 including also reinforcement consisting of non-corrosive wires.

9. A fire-resisting material consisting essentially of a layer of woven refractory ceramic fibers composed of an alumino-boro-silicate composition and a non-foaming silicone rubber compound within which said ceramic fiber fabric is totally encapsulated and by which it is fully impregnated to maintain structural integrity and prevent burn through when exposed to flame for fifteen minutes at 1100° C.

10. A method of making a coherent fire-resisting flexible sheet material comprising the steps of:
laying up a woven fabric of refractory ceramic fibers;
applying a curable non-foaming silicone rubber compound in the form of a thixotropic paste to entirely cover the fabric,
pressing the silicone rubber compound paste through the interstices of the fabric to fully impregnate and totally encapsulate the fabric; and
heat-curing the silicone rubber impregnated product to render it capable of maintaining structural integrity when exposed to flame at 1100° C. for fifteen minutes.

11. A method according to claim 10, wherein the woven fabric is a plain weave of monofilament alumino-boro-silicate fibers of 11 μm average size, the silicone rubber compound is a methyl-phenyl silicone compound, and the curing step is carried out at a temperature of at least 100° C.

* * * * *